(12) United States Patent  (10) Patent No.: US 8,073,256 B2
Nozaki  (45) Date of Patent: Dec. 6, 2011

(54) IMAGE PROCESSING APPARATUS AND METHOD THEREFOR

(75) Inventor: Akira Nozaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 647 days.

(21) Appl. No.: 12/270,732

(22) Filed: Nov. 13, 2008

(65) Prior Publication Data

US 2009/0129680 A1    May 21, 2009

(30) Foreign Application Priority Data

Nov. 15, 2007  (JP) ................................ 2007-297198
Oct. 15, 2008  (JP) ................................ 2008-266832

(51) Int. Cl.
    *G06K 9/00*  (2006.01)
(52) U.S. Cl. ........................................ 382/181; 382/312
(58) Field of Classification Search ........... 382/100–312
    See application file for complete search history.

(56) References Cited

U.S. PATENT DOCUMENTS

| | | | | |
|---|---|---|---|---|
| 4,817,171 A * | 3/1989 | Stentiford | ...................... | 382/195 |
| 5,271,067 A * | 12/1993 | Abe et al. | ...................... | 382/311 |
| 5,566,003 A * | 10/1996 | Hara et al. | ...................... | 358/448 |
| 6,687,016 B2 * | 2/2004 | Gauthier | ...................... | 358/1.11 |
| 6,738,518 B1 * | 5/2004 | Minka et al. | ...................... | 382/218 |
| 7,010,745 B1 * | 3/2006 | Shimada et al. | ...................... | 715/205 |
| 7,400,765 B2 | 7/2008 | Kasutani et al. | | |
| 7,646,921 B2 * | 1/2010 | Vincent et al. | ...................... | 382/225 |
| 7,650,035 B2 * | 1/2010 | Vincent et al. | ...................... | 382/225 |
| 7,729,540 B2 * | 6/2010 | Koyama et al. | ...................... | 382/181 |
| 2006/0039045 A1 * | 2/2006 | Sato et al. | ...................... | 358/538 |
| 2006/0204094 A1 * | 9/2006 | Koyama et al. | ...................... | 382/176 |

FOREIGN PATENT DOCUMENTS

| | | |
|---|---|---|
| JP | 9-006948 A | 1/1997 |
| JP | 2000-148790 A | 5/2000 |
| JP | 2002-082985 A | 3/2002 |
| JP | 2006-304276 A | 11/2006 |

* cited by examiner

*Primary Examiner* — Manav Seth

(57) ABSTRACT

Replacement target image data and image data for replacement are stored, character images of the replacement target image data and character images of the image data for replacement are extracted, and character recognition is performed for each page on character strings contained in the extracted character images. Then, a comparison is performed for each page of the character strings of pages of the replacement target image data and the character strings of pages of the image data for replacement, which have undergone character recognition, and a degree of similarity therebetween is determined. Then, based on a determination result, at least a portion of pages of the replacement target image data is replaced with at least a portion of pages of the image data for replacement.

12 Claims, 9 Drawing Sheets

FIG. 3

IMAGE DATA REPLACEMENT

REPLACEMENT TARGET IMAGE DATA : | C:¥File1 | BROWSE ...

301

| A | B | C | D | E |

IMAGE DATA FOR REPLACEMENT : | C:¥File2 | BROWSE ...

302

| F | G |

FILE NAME : File1_NEW

LOCATION FOR SAVING : C:¥   BROWSE ...

REPLACEMENT STANDARD VALUE : 90 %

303

EXECUTE   CANCEL

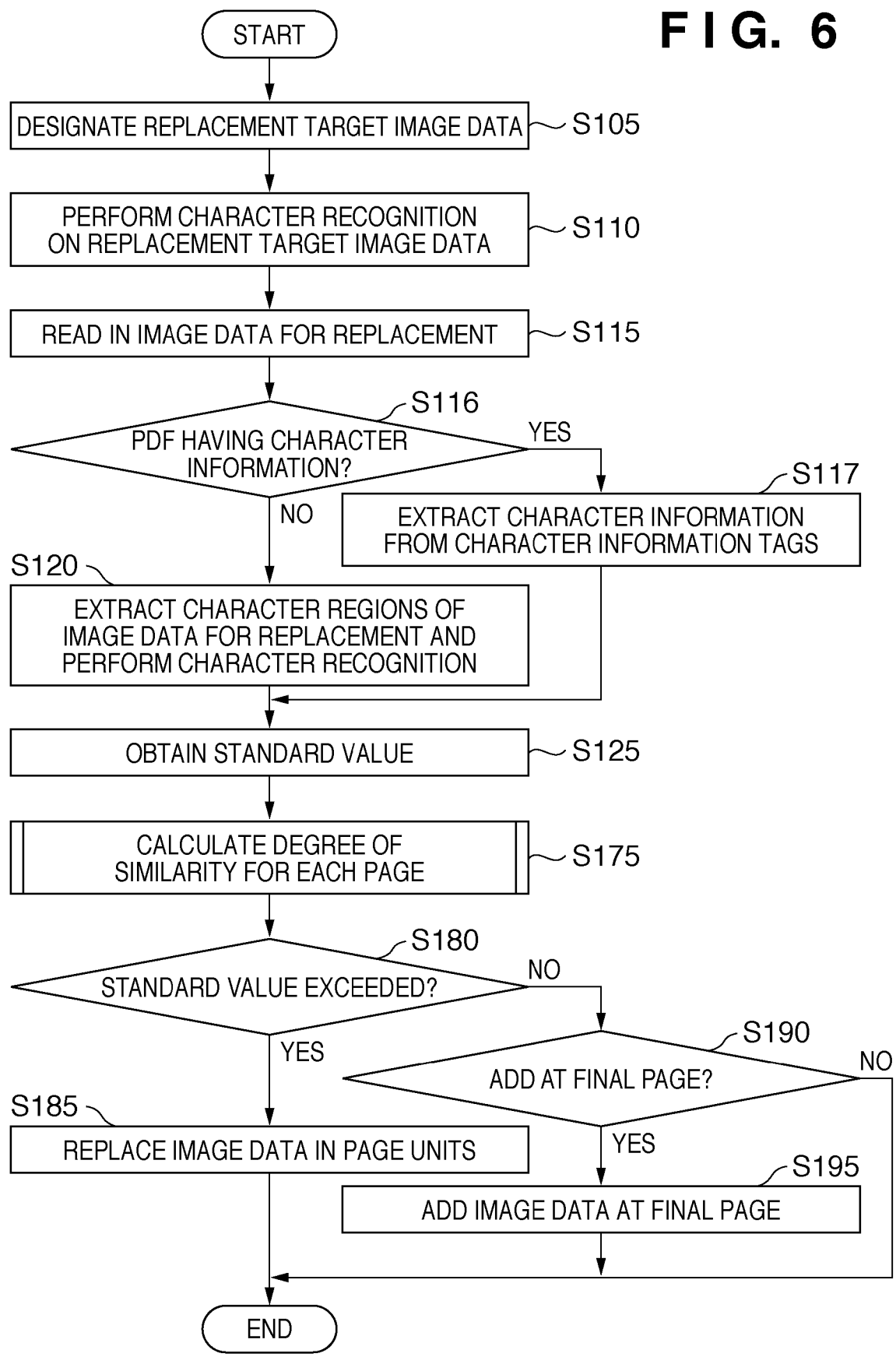

IMAGE PROCESSING APPARATUS AND METHOD THEREFOR

BACKGROUND OF THE INVENTION

1. Field of the Invention

The present invention relates to an image processing apparatus and method that carry out replacement of a portion of image data easily by performing character recognition on character strings contained in character images of the image original.

2. Description of the Related Art

Regarding image data of an image original comprising a plurality of pages, there has hitherto been a demand to replace corresponding pages within the former image original with new image data resulting from revisions and corrections on image data of a portion of the pages within the former image. Furthermore, there has also been a demand to add new pages. As a conventional technique of a technical field similar to the present invention, a technique has been disclosed (see Japanese Patent Laid-Open No. H9-6948) in which a document for replacement is read in, a page number is identified, and replacements or additions of image data are carried out in page units with respect to pages of the document designated as replacement targets. Also disclosed in Japanese Patent Laid-Open No. H9-6948 is a technique in which a paper, on which information regarding the document for replacement is described, is read in, and a page number or the like of the document for replacement is identified based on this information such that replacements or additions of image data are carried out in page units with respect to the document targeted to be replaced.

Furthermore, a technique (see Japanese Patent Laid-Open No. 2000-148790) is disclosed in which image data of the image original targeted to be replaced and image data of the image original for replacement are binarized respectively and compared in pixel units, keywords are detected from the respective character regions to retrieve keywords, thereby retrieving similar images to replace pages.

Furthermore, a technique (see Japanese Patent Laid-Open No. 2002-82985) has been disclosed as one technique of technologies to retrieve similar images in which a degree of similarity is calculated by comparing a histogram of the image targeted for retrieval and a histogram of the original image.

However, in the above-mentioned conventional techniques, the page number of the document for replacement must be designated or the page number of the document for replacement must be specified by a user. On the other hand, there is a technique as disclosed in Japanese Patent Laid-Open No. 2000-148790 in which, in the case where the page number is not specified, the image data of the document of the desired page number is replaced by reading in a paper on which information is described regarding the document for replacement. However, time and effort is required for separately reading in the paper on which information is described regarding the document for replacement on which page numbers are described. Further still, in the case there is a cover sheet or the like on which there is no page number in the image original of the replacement target, it is necessary to structure such documents so that different page numbers are designated since the page structure is different from an image original in which all pages have page numbers.

Further still, in image data replacement for image originals based on keyword retrieval, there is a possibility that a replacement target will be incorrectly recognized if the keywords are the same even though it is a document that should not undergo replacement. Furthermore, conventionally it is necessary when replacing image data to either convert the replacement target image data and the image data for replacement to the same application data format and carry out a task of comparing their degrees of similarity in the same given application, or to temporarily convert the images into binarized images and compare their degrees of similarity. For this reason, in cases where the original image data to undergo replacement is not image data but rather a paper original, the original is first read by a scanner then converted to the same application data format as the replacement target image data, after which the degree of similarity is determined. In this case, there is a risk that dust or the like present on the scanned original or the scanning platen will adversely affect the histogram and that originals that are the same document will be determined to be different documents. Moreover, performing binarization and carrying out comparisons for each pixel is onerous and time consuming.

SUMMARY OF THE INVENTION

The present invention has been devised in light of these issues, and it is a feature thereof to provide an image processing apparatus and a method for replacing image data per page by determining degrees of similarity with ease and high reliability even in the case where information for replacement is not described in the image for replacement and without converting the replacement target image data and the image data for replacement into data of the same application format or binarized data.

According to an aspect of the present invention, there is provided an image processing apparatus in which at least a portion of pages of a first set of image data comprising a plurality of pages is replaced by at least a portion of pages of a second set of image data comprising a plurality of pages, includes a storage unit configured to store the first set of image data and the second set of image data, an extraction unit configured to extract character images of the first set of image data and character images of the second set of image data, a character recognition unit configured to, for each page, perform character recognition on character strings contained in the character images extracted by the extraction unit, a similarity determination unit configured to, for each page, compare the character strings of pages of the first set of image data and the character strings of pages of the second set of image data, which have undergone character recognition by the character recognition unit, and determines a degree of similarity therebetween, and a replacement unit configured to replace at least the portion of pages of the first set of image data with at least the portion of pages of the second set of image data based on a determination result of the similarity determination unit.

According to another aspect of the present invention, there is provided a method for image processing in which at least a portion of pages of a first set of image data comprising a plurality of pages is replaced by at least a portion of pages of a second set of image data comprising a plurality of pages, the method includes storing the first set of image data and the second set of image data, extracting character images of the first set of image data and character images of the second set of image data, performing character recognition for each page on character strings contained in the extracted character images, determining a degree of similarity by comparing for each page the character strings of pages of the first set of image data and the character strings of pages of the second set of image data, which have undergone character recognition in the performing character recognition, and determining a degree of similarity therebetween, and replacing at least a portion of pages of the first set of image data with at least a portion of pages of the second set of image data based on a determination result of the degree of similarity.

With an image processing apparatus according to the present invention, it is possible to automatically carry out replacements of image data per page even when information for replacement is not included in the image for replacement, which reduces the burden on an operator. Furthermore, it provides an effect of improving accuracy compared to a case of carrying out replacements of image data of image originals by comparing the images through the application of conventional retrieval technologies of similar images.

Further features and aspects of the present invention will become apparent from the following description of exemplary embodiments with reference to the attached drawings.

BRIEF DESCRIPTION OF THE DRAWINGS

FIG. 3 is a schematic diagram depicting one example of a display screen of a user interface of an image data replacement application.

FIG. 6 is a flowchart depicting an image data replacement process according to a second exemplary embodiment.

DESCRIPTION OF THE EMBODIMENTS

Hereinafter, embodiments of the present invention are described in detail with reference to the accompanying drawings.

It should be noted that unless particular description is given otherwise for the purpose of differentiation, images in the present specification also include characters and the like.

First Exemplary Embodiment

Figure 1:
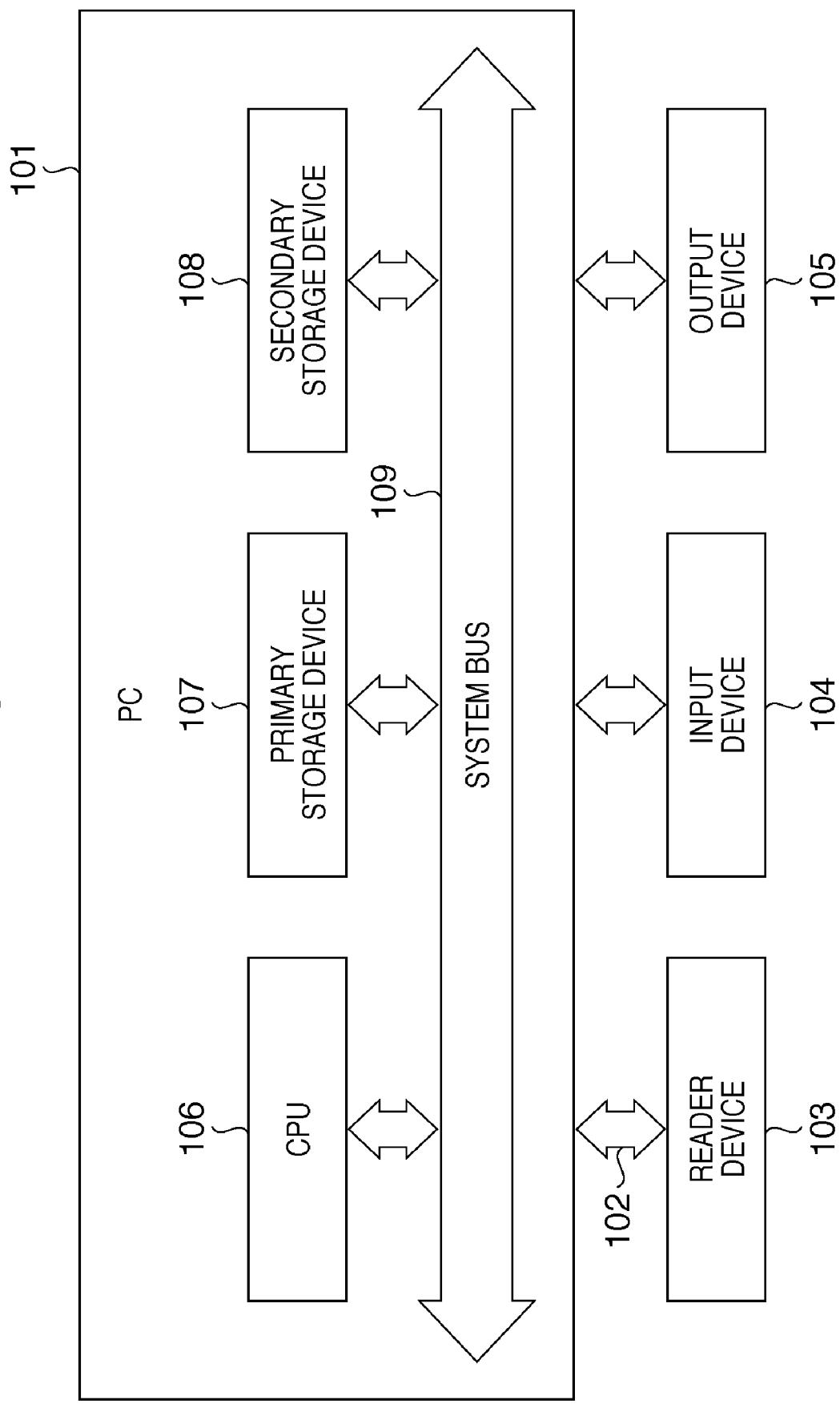
FIG. 1 depicts an exemplary configuration of an image processing apparatus according to an embodiment of the present invention.

FIG. 1 depicts an exemplary configuration of an image processing apparatus according to an embodiment of the present invention.

In FIG. 1, the image processing apparatus includes a reader device 103, an input device 104, and an output device 105 connected to a PC 101, these being connected by an interface 102 such as USB or the like. A CPU 106 is a central processing unit that performs calculations, determinations, and control based on data and commands, and executes programs and the like that are stored in a primary storage device 107. The primary storage device 107 is a memory such as a nonvolatile RAM capable of storing data mainly temporarily, and it loads and stores programs and the like that are stored in a secondary storage device 108. For example, a hard disk or the like corresponds to the secondary storage device 108. In the present embodiment, a program is stored in advance in the secondary storage device 108, which is then loaded into the primary storage device 107 when the program is to be executed, and executed by the CPU 106.

Furthermore, a scanner, or a multi-function peripheral equipped with functions of a scanner, printer, and facsimile machine for example, corresponds to the reader device 103. The input device 104 accepts instructions and selections from a user and this corresponds to components such as a mouse, keyboard, and controller for example. For example, a display or the like corresponds to the output device 105.

A system bus 109 indicates transmission paths for commands and data transmissions between the CPU 106, the primary storage device 107, and the secondary storage device 108.

Figure 2:
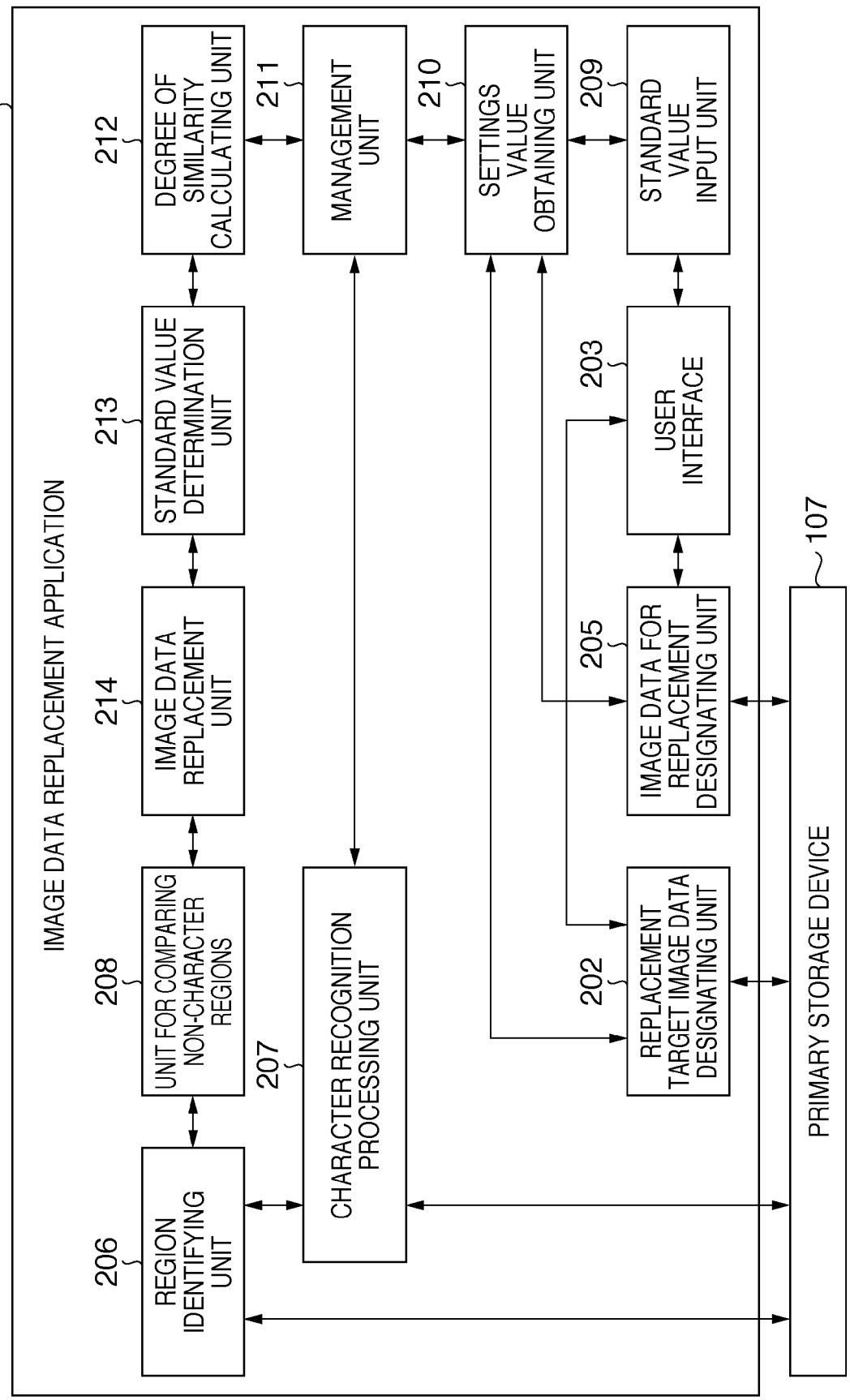
FIG. 2 is a block diagram depicting a functional configuration diagram of an image data replacement application in the image processing apparatus shown in FIG. 1.

FIG. 2 is a block diagram depicting a functional configuration diagram of an image data replacement application stored in the secondary storage device 108 in the image processing apparatus shown in FIG. 1.

In an image data replacement application 201, a replacement target image data designating unit 202 designates replacement target image data, which has been designated via a user interface 203, and this image data is read in from the primary storage device 107 shown in FIG. 1. It should be noted that replacement target image data refers to image data of an image original comprising the number of pages N when at least a portion of image data of an image original comprising N pages that have been read previously is to be replaced by at least a portion of image data of an image original comprising the number of pages M that have been newly read in. Specifically, this is data that has been generated in a PDF (portable document format) format. The PDF format is a document format capable of including multiple pages in a single file, and is a format structured in a manner such that each object included in the pages is expressible in a hierarchical structure. With the PDF format, in addition to objects of image data, it is possible to have objects of character information (information such as character positions, character codes, and fonts) as a separate hierarchical class. Furthermore, image data for replacement refers to image data of an image original comprising M pages in this case, and is image data of a plurality of scanned pages or PDF files saved on a personal computer.

An image data for replacement designating unit 205 designates image data for replacement.

A region identifying unit 206 extracts character images from the replacement target image data and image data for replacement respectively, which have been read in from the primary storage device 107, and classifies these as character regions and non-character regions. A character recognition processing unit 207 performs character recognition based on the image data of regions determined to be character regions by the region identifying unit 206. Furthermore, a unit for comparing non-character regions 208 compares regions determined to be non-character regions by the region identifying unit 206.

A standard value input unit 209 obtains a standard value of a degree of similarity from the user via the user interface 203. A settings value obtaining unit 210 obtains the standard value input from the standard value input unit 209 and saves this to a management unit 211. The management unit 211 saves and manages data concerning the standard values obtained by the settings value obtaining unit 210 and the character strings recognized by the character recognition processing unit 207.

A degree of similarity calculating unit 212 carries out a comparison of character strings of replacement target image data and character strings of image data for replacement, which are saved in the management unit 211, for each page in accordance with an arrangement of the character strings, and calculates a degree of similarity between these for each page. A standard value determination unit 213 performs a judgment of similarity by determining whether the degree of similarity calculated by the degree of similarity calculating unit 212 exceeds the standard value that has been set by the user. In the case where the standard value has been exceeded in accordance with a determination result of the standard value determination unit 213, an image data replacement unit 214 replaces the image data of the relevant page, then stores this in the PDF format with a file name and location for saving as illustrated in FIG. 3.

The foregoing described a configuration outline of the image processing apparatus according to an embodiment of the present invention and a functional configuration of an image data replacement application in this image processing apparatus.

FIG. 3 is a schematic diagram depicting one example of a display screen of the user interface 203 of the image data replacement application 201.

A settings field 301 for replacement target image data designates a location where image data that the user desires to be replaced is stored. A settings field 302 for image data for replacement enables the user to designate or add image data desired to be used for replacement. By pushing a button (not shown in diagram), it is possible to designate data that has been read by the reader device 103 as the image data for replacement, or designate image data for replacement to be read out from the secondary storage device 108. Then, a standard value of a degree of similarity for when replacement target image data is to be replaced by the image data for replacement is set in a replacement standard value settings field 303. Replacement target image data that exceeds the degree of similarity of the standard value is replaced by the image data for replacement. In this manner, the image data after replacement is decided by the settings of the settings field 301 for replacement target image data, the settings field 302 for image data for replacement, and the replacement standard value settings field 303.

Figure 4:
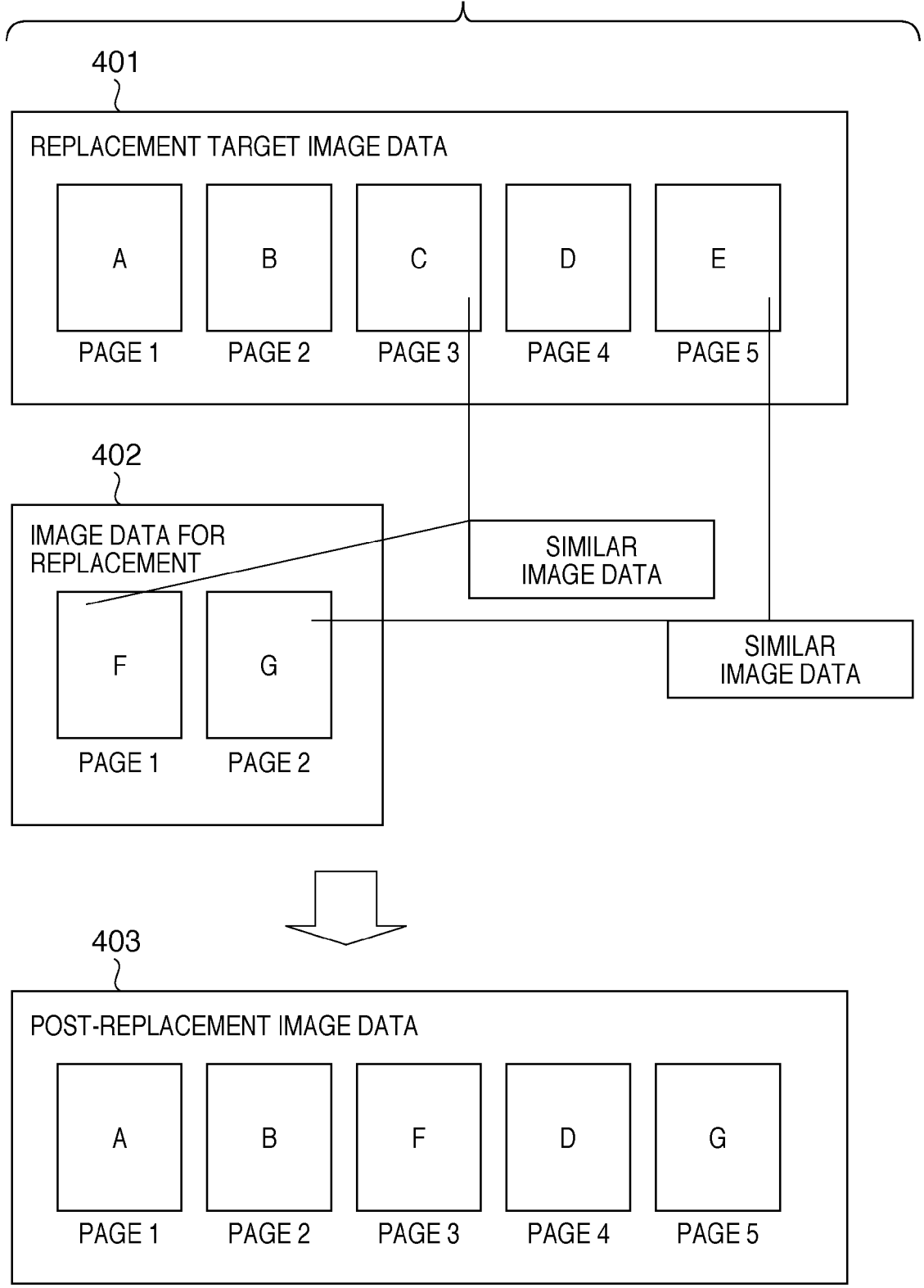
FIG. 4 is a diagram for describing an operational example of the image data replacement unit of the image data replacement application.

FIG. 4 is a diagram for describing an operational example of the image data replacement unit 214 of the image data replacement application 201.

Suppose it is determined that image data sets C and E of replacement target image data 401 are similar to image data sets F and G, respectively, of image data for replacement 402. As shown by post-replacement image data 403, when replacement of image data is executed in page units by the image data replacement unit 214, the image data set C of the replacement target image data 401 is deleted and the image data set F of the image data for replacement 402 is inserted in that page. Further still, the image data set E of the replacement target image data 401 is deleted and the image data set G of the image data for replacement 402 is inserted in that page.

Next, a description is provided regarding a procedure of image data replacement processing that is executed in the above-described image processing apparatus.

Figure 5:
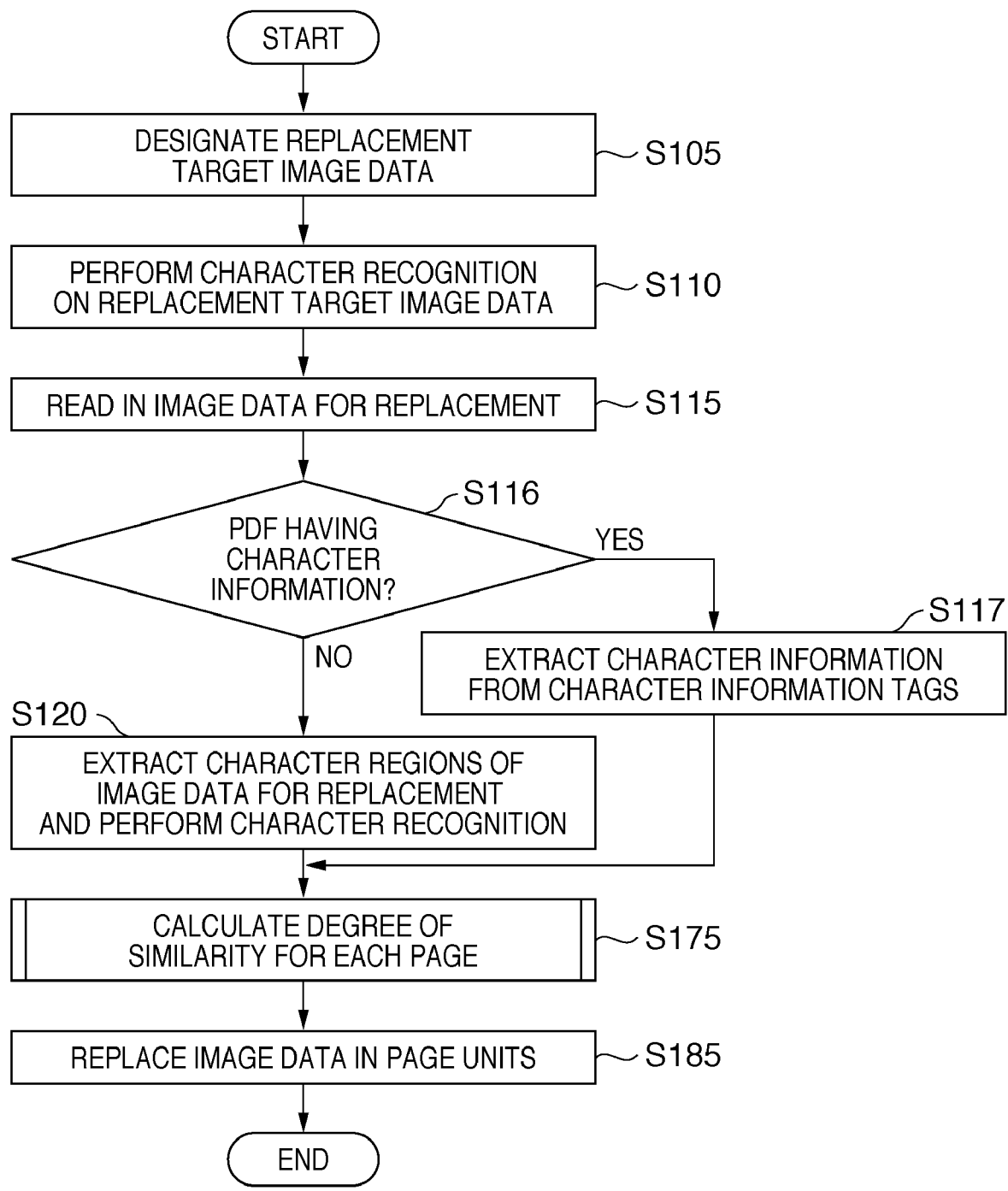
FIG. 5 is a flowchart depicting an image data replacement process according to a first exemplary embodiment.

FIG. 5 is a flowchart depicting an image data replacement process according to the present embodiment. Unless stated otherwise, the processing at each step of this flowchart is achieved by having the image processing apparatus (the PC 101) (FIG. 1) execute the image data replacement application 201 (FIG. 2) (the same is true for FIGS. 6 to 8).

First, at step S105, replacement target image data is designated including pages the user desires to replace. Next, at step S110, character recognition is performed by the character recognition processing unit 207 on the replacement target image data designated by the user. In the case where the replacement target image data is a PDF having character information in the image data, character recognition is not carried out, but rather a result of carrying out character extraction from tags indicating character information contained in the file is used as a character recognition result. Next, at step S115, image data for replacement designated by the user is read in. Here, the image data for replacement is not limited to PDF format image data that is stored in the secondary storage device 108, image data that has been read in from the reader device 103 may also be used. In this case, after scanning, the image data is displayed on the UI as image data for replacement. Next, at step S116, a determination is performed as to whether the image data for replacement is a PDF having character information. In the case of a PDF having character information (YES in step S116), the character information is extracted from the character information tags (step S117). In the case where the image data for replacement is not a PDF having character information at step S116 (NO in step S116), character regions from all of the image data for replacement are extracted by the character recognition processing unit 207 at step S120, and character recognition is performed (the processing at step S120 is also referred to as OCR processing).

Next, at step S175, a comparison is performed between character information extracted from the character information tags in each page of the image data for replacement or character strings extracted from the character regions and recognized and the character information in all pages of the replacement target image data. Then, a degree of similarity is calculated for each page. The processing at step S175 is described in more details in connection with FIG. 8 below.

First, at step S801, a comparison target page number N of the replacement target image data and a comparison target page number M of the image data for replacement are set to 1. At step S802, character information of the first page of the replacement target image data and the character information of the first page of the image data for replacement are compared to calculate a degree of similarity.

For example, this comparison involves comparing a character string of the image data for replacement and a character string of the replacement target image data character by character in order from the first character so that a unique determination is made as to whether each character matches. Furthermore, the degree of similarity may be obtained by using these determination results and calculating a proportion of a number of characters that match with respect to a total number of characters contained in the comparison target page of the replacement target image data in relation to the comparison target page of the image data for replacement.

Next, at step S803, a determination is performed as to whether the page of image data for replacement processed at step S802 is the final page. If it is not the final page (NO in step S803), the comparison target page of the image data for replacement transitions to the next page at step S804. Then, the procedure returns to step S802 and a degree of similarity is calculated in regard to the first page of the replacement target image data and the second page of the image data for replacement. This is repeated until the final page of the image data for replacement is processed.

When it has been determined at step S803 that the final page of the image data for replacement has been processed (YES in step S803), a determination is performed at step S805 as to whether the replacement target image data processed at S802 is the final page. If it is not the final page (NO in step S805), the processing target page of the replacement target image data transitions to the next page at step S806 and the processing target page of the image data for replacement returns to the first page. Then the procedure returns to step S802 and equivalent processing is repeated until the final page of the replacement target image data is processed. After this, processing transitions to step S185.

Returning to FIG. 5, at step S185, the pages having the highest degrees of similarity among the pages of the image data for replacement are respectively replaced into the pages of the replacement target images. A reason for replacing the pages having the highest degrees of similarity is that since image data for replacement is generally data that has been revised or corrected based on the replacement target images, there is a high probability that the pages having the highest degrees of similarity in the image data for replacement are the images for replacement corresponding to the replacement target images.

Then, the image data is stored under the file name and at the saving location designated at FIG. 3 in PDF format and the procedure finishes.

Furthermore, it is possible to have the user select for each page whether to execute replacement by displaying a message box asking for confirmation as to whether to replace the image data.

Second Exemplary Embodiment

FIG. 6 is a flowchart depicting an image data replacement process according to the second exemplary embodiment.

The second exemplary embodiment involves a processing technique in which a process has been added to the processing technique of the first embodiment, such that a determination is performed as to whether the degree of similarity exceeds the standard value, then a determination is performed in response to the determination result as to whether to replace or add the image data. This is because in the case where the numerical values of the degrees of similarity are low overall, pages having the highest degrees of similarity therein may not necessarily be pages of images for replacement corresponding to pages of the replacement target images. For this reason, it is an object to more accurately specify replacement target images by adding a determination using standard values set by the user.

The steps S105 to S120 and step S175 are common in the flowchart indicating the image data replacement processing shown in FIG. 5 of embodiment 1, and therefore further description is omitted.

At step S125, a standard value of the degree of similarity is obtained in order to determine pages to be replaced; the standard value is input by the user in FIG. 3.

At step S180, the degree of similarity of the page having the largest degree of similarity among those calculated for each page at step S175 is compared with the standard value of degree of similarity (input by the user) obtained at step S125. For pages having a largest degree of similarity (i.e., candidates for replacement) exceeds the standard value, the procedure proceeds to step S185 and the image data of those respective pages is replaced. Pages of image data for replacement whose degree of similarity is not greater than the standard value are considered as image data for adding. Then, at step S190, the user is asked by a message box whether the image data for adding should be added at the final page of image data of the replacement target images. When the user selects to add the image data at the final page (YES in step S190), the image data for adding is added to the final page of the replacement target image data at step S195, and when the user selects not to add the image data to the final page (NO in step S190), processing finishes there.

It should be noted that in the case where there are pages that did not become replacement targets since their degree of similarity was not largest even though their degree of similarity was not less than the standard value, a confirmation may be made to the user as to whether or not to add these pages at the final page in a same manner as the processing for pages of image data for replacement whose degree of similarity is not greater than the standard value. By providing a standard value in this manner to determine whether to set pages as replacement targets, it becomes possible to determine with greater accuracy the pages that are replacement candidates.

Third Exemplary Embodiment

Figure 7A:
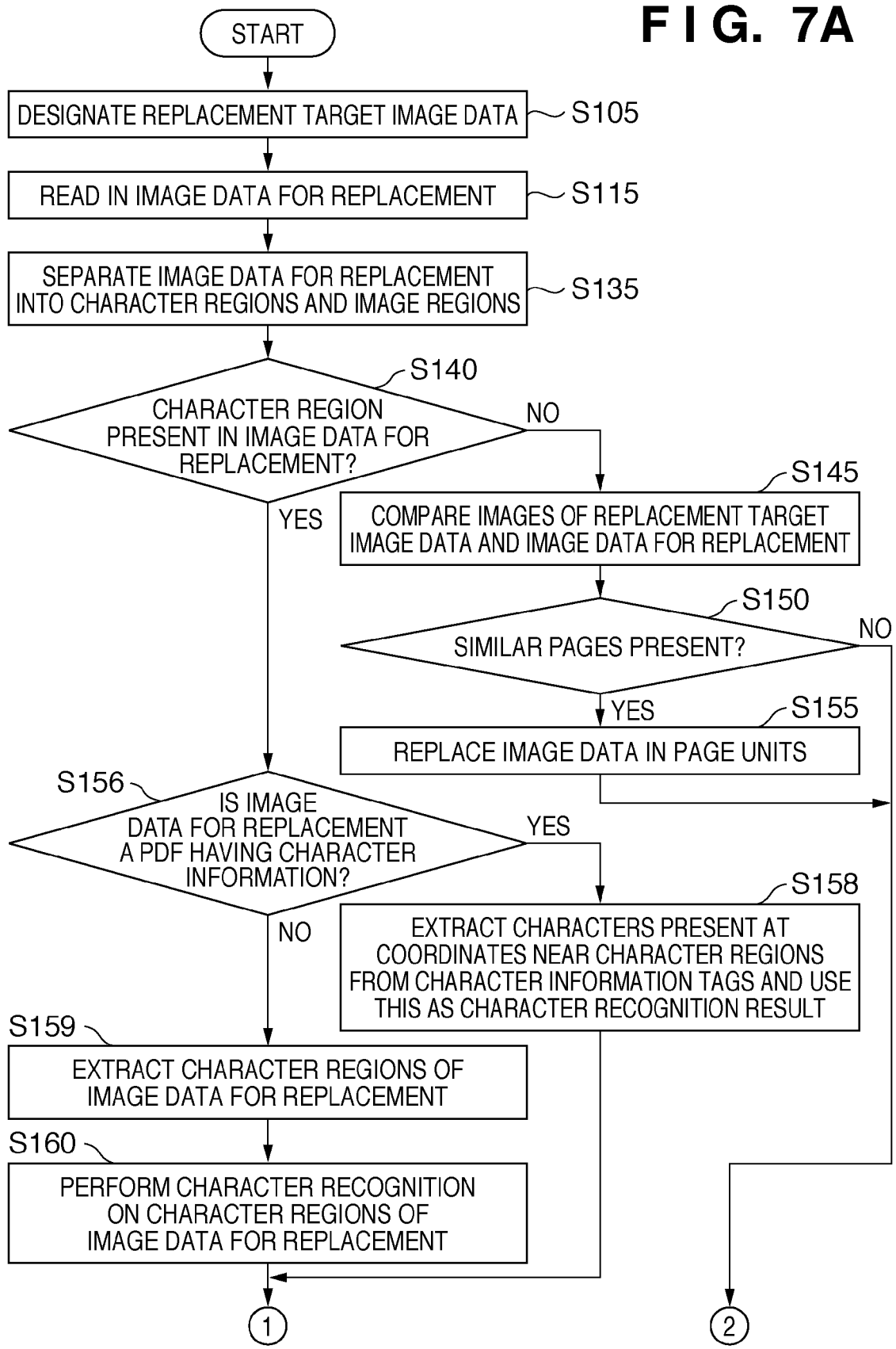
FIGS. 7A and 7B are flowcharts depicting an image data replacement process according to a third exemplary embodiment.
Figure 7B:
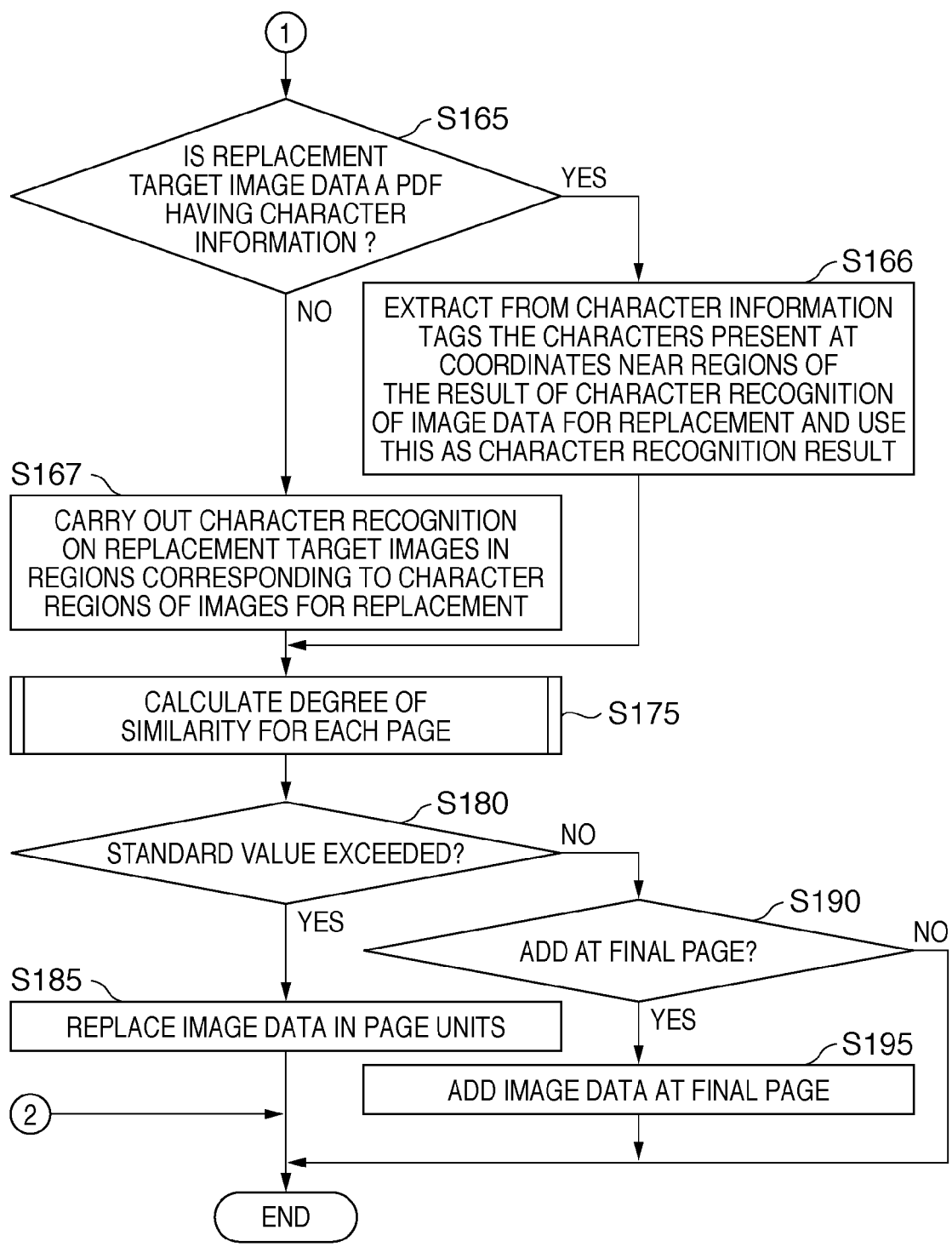
Figure 8:
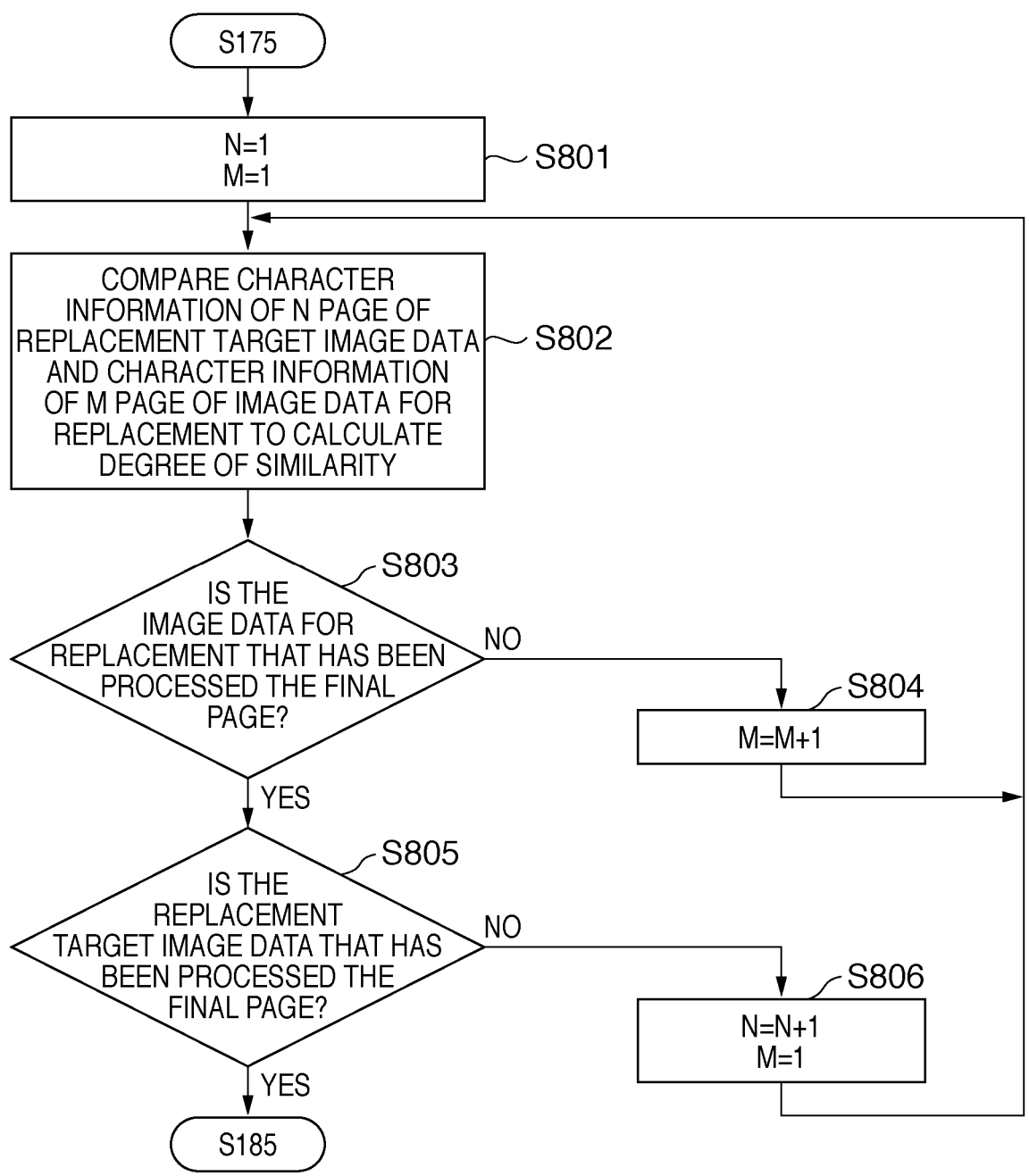
FIG. 8 is a flowchart depicting details of step S175 of FIG. 5.

FIGS. 7A and 7B are flowcharts depicting an image data replacement process according to the third exemplary embodiment.

The third exemplary embodiment involves a processing technique in which added to the processing technique of the second exemplary embodiment is a process of determining whether a character region is present, a process of image data replacement processing for pages in which character regions are not present, and a process of extracting characters in which positional information is used.

The steps S175 to S195 are common in the flowchart indicating the image data replacement processing shown in FIG. 6. For this reason, further description of these steps is omitted.

At step S105, replacement target image data is designated. Next, image data for replacement is designated and read in at step S115.

At step S135, the region identifying unit 206 carries out a process of separating character regions and image non-character regions for the image data for replacement designated by the user.

Then, at step S140, a determination is performed for each page as to whether a character region is present in the image data for replacement designated by the user. For pages for which it is determined that character regions are not present, an image comparison is carried out at step S145 with image regions of each page of the replacement target image data. The image comparisons may be carried out using an ordinary technique of retrieving similar images such as comparing degrees of similarity for each pixel or by using image histograms. When a similar image is detected at step S145, it is determined at step S150 that whether a similar page is present. Pages among the replacement target image data for which it is determined that a similar page is present are replaced by the similar pages of image data for replacement at step S155. In the case where it is determined at step S150 that a similar page is not present, processing finishes there.

For pages for which it is determined at step S140 that character regions of image data for replacement are present, a determination is performed at step S156 as to whether the image data for replacement is a PDF having character information. When the image data for replacement is a PDF having character information (YES in step S156), the character information tags are used at step S158 and characters present at the coordinates of the character region are used as a character recognition result and the procedure proceeds to step S165 (FIG. 7B). In the case where it is determined at step S156 that it is a PDF not having character information (NO in step S156), character regions of the image data for replacement are extracted at step S159. Next, at step S160, character recognition is performed by the character recognition processing unit 207 on the image data in the character regions of the image data for replacement. Transitioning here to FIG. 7B, next a determination is performed at step S165 as to whether the replacement target image data is a PDF having character information. When it is a PDF having character information (YES in step S165), the procedure proceeds to step S166. At step S166, character information is extracted from character information tags of regions of the replacement target image data corresponding to regions for which character recognition was carried out on image data for replacement at step S158 or step S160 and the character information is used as a character recognition result. In a case of a PDF not having character information (NO in step S165), the procedure proceeds to step S167. At step S167, character recognition is carried out on regions of replacement target image data corresponding to regions for which character recognition was carried out on image data for replacement at step S158 or step S160. At step S175, a determination is performed on the degree of similarity for each page using the character recognition results in regard to the replacement target image data and the image data for replacement respectively (here onward, the processing is equivalent to the second exemplary embodiment).

In the present embodiment, a determination of degree of similarity is performed for corresponding regions of the replacement target image data based on positional information in which character regions of the image data for replacement have been extracted.

For this reason, compared to techniques that compare the entire image, it is possible to perform the determination of the degree of similarity in a short time.

By using PDF information of image data in this manner, degrees of similarity can be determined even for data in different formats such as PDF and image data read in by a scanner. Furthermore, since it is not necessary to convert both sets of image data to binarized data, the processing load can be reduced compared to that when using conventional techniques. Furthermore, since the degree of similarity is determined by comparing character information character by character, the degree of similarity can be determined with high reliability compared to conventional comparisons using image features.

It should be noted that the present invention also includes a computer-readable storage medium storing a program for causing a computer to function as the above-described image processing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-297198, filed on Nov. 15, 2007, and No. 2008-266832, filed on Oct. 15, 2008 which are hereby incorporated by reference herein in their entirety.

What is claimed is:

1. An image processing apparatus in which at least a portion of pages of a first set of image data comprising a plurality of pages is replaced by at least a portion of pages of a second set of image data comprising a plurality of pages, comprising:
   a storage unit configured to store the first set of image data and the second set of image data;
   an extraction unit configured to extract character images of the first set of image data and character images of the second set of image data;
   a character recognition unit configured to, for each page, perform character recognition on character strings contained in the character images extracted by the extraction unit;
   a similarity determination unit configured to, for each page, compare the character strings of pages of the first set of image data and the character strings of pages of the second set of image data, which have undergone character recognition by the character recognition unit, and determines a degree of similarity therebetween; and
   a replacement unit configured to replace at least the portion of pages of the first set of image data with at least the portion of pages of the second set of image data based on a determination result of the similarity determination unit.

2. The image processing apparatus according to claim 1, wherein the similarity determination unit determines a degree of similarity using a proportion of characters that match in character strings of each page of the first set of image data and the second set of image data.

3. The image processing apparatus according to claim 2, wherein the replacement unit performs replacement on the first set of image data for pages in which the proportion exceeds a standard value.

4. The image processing apparatus according to claim 3, further comprising an addition unit which adds image data of pages in which the proportion is not greater than the standard value to the first set of image data.

5. The image processing apparatus according to claim 4, further comprising an accepting unit configured to accept a selection by a user as to whether to perform an addition by the addition unit.

6. The image processing apparatus according to claim 3, further comprising a setting unit configured to set the standard value.

7. The image processing apparatus according to claim 1, further comprising a scanner which reads an image original,
   wherein the storage unit has a nonvolatile storage unit which stores the first set of image data and a volatile storage unit which temporarily stores the second set of image data obtained by reading the image original using the scanner.

8. The image processing apparatus according to claim 1, wherein the first set of image data is in a format structured in a hierarchical structure for each object and is capable of having a hierarchical class of character information in the hierarchical structure.

9. The image processing apparatus according to claim 8, wherein the character recognition unit performs character recognition regarding the first set of image data on only regions corresponding to character regions contained in the second set of image data.

10. The image processing apparatus according to claim 8, wherein the extraction unit uses character information held in image data to extract characters from the first set of image data in only regions corresponding to character regions contained in the second set of image data.

11. A method for image processing in which at least a portion of pages of a first set of image data comprising a plurality of pages is replaced by at least a portion of pages of a second set of image data comprising a plurality of pages, the method comprising:
   storing the first set of image data and the second set of image data;
   extracting character images of the first set of image data and character images of the second set of image data;
   performing character recognition for each page on character strings contained in the extracted character images;

determining a degree of similarity by comparing for each page the character strings of pages of the first set of image data and the character strings of pages of the second set of image data, which have undergone character recognition in the performing character recognition, and determining a degree of similarity therebetween; and replacing at least the portion of pages of the first set of image data with at least the portion of pages of the second set of image data based on a determination result of the degree of similarity.

12. A non-transitory computer-readable storage medium encoded with a computer-executable program for causing a computer to perform the method for image processing according to claim 11.

* * * * *